(12) United States Patent
Pal

(10) Patent No.: US 8,521,029 B2
(45) Date of Patent: Aug. 27, 2013

(54) GRAVITY MODULATOR AND GRAVITY-MODULATION RECEPTION

(76) Inventor: Anadish Kumar Pal, Delhi (IN)

( * ) Notice: Subject to any disclaimer, the term of this patent is extended or adjusted under 35 U.S.C. 154(b) by 423 days.

(21) Appl. No.: 13/045,558

(22) Filed: Mar. 11, 2011

(65) Prior Publication Data

US 2012/0174668 A1    Jul. 12, 2012

(51) Int. Cl.
*H04B 10/12* (2011.01)

(52) U.S. Cl.
USPC .............................. 398/133; 398/134; 398/207

(58) Field of Classification Search
USPC ................... 398/132–134, 202–214
See application file for complete search history.

(56) References Cited

U.S. PATENT DOCUMENTS 5,504,719 A * 4/1996 Jacobs .......................... 367/149
5,520,356 A * 5/1996 Ensley .......................... 244/62
2008/0154128 A1 * 6/2008 Milner .......................... 600/427
2012/0212375 A1 * 8/2012 Depree, IV ............ 343/700 MS
2013/0120234 A1 * 5/2013 Atkins .......................... 345/102

* cited by examiner

*Primary Examiner* — Dzung Tran

(57) ABSTRACT

An arrangement of gravity modulator and gravity-modulation receiver where photons or electromagnetic radiation is modulated electronically or mechanically to reach either a solid, liquid or mixed target possibly through or followed by a surrounding medium to produce gravity modulation in the target to effect gravity signaling which is received by a gravity-modulation receiver in or not in physical contact with the target. In the receiver, one or more piezo-electric transducer/s or quartz crystal/s receive the gravity modulation amplified for further signal processing. When not in physical contact with the target, the piezo-electric transducer/s is/are loaded with a resonator mass of natural resonant frequency either equal to, half, one third or one fifth of the frequency of the gravity modulator, the quartz crystal/s is/are gravity biased with a high-density metal piece along one direction of the oscillation mode of the crystal/s with natural resonant frequency similar to the resonator mass.

20 Claims, 3 Drawing Sheets

GRAVITY MODULATOR AND GRAVITY-MODULATION RECEPTION

BACKGROUND OF THE INVENTION

Present invention is directed to the field of gravity and its fluctuations.

Regular gravity fluctuations can be produced and used to effect communication; a communication link based on gravitational waves can travel through the Earth and thus present-day geo-stationary satellite based microwave communication links could be augmented and replaced. Even, weak gravity modulations of certain frequencies can be utilized for geological mapping and prospecting and medical imaging.

All of the existing modes of gravity fluctuations are known to be of distant celestial origin. However, based on this inventor's research whose physical background essentially has foundations in Compton nuclear scattering, a new theoretical approach to the origins of gravity postulated in December 2007 was first faintly confirmed experimentally on Sep. 1, 2010 and thereafter further confirmation occurred on Sep. 30, 2010 followed by a series of experiments conducted by him till date, and are continuing.

BRIEF SUMMARY OF THE INVENTION

With reference to the above-presented background and limitations, an arrangement of gravity modulator and gravity-modulation receiver of the present invention in its first version is made of at least one gravity modulator producing gravity modulation and at least one gravity-modulation receiver means. The gravity modulator has at least one photon source means, holding means for the photon source means, modulation means to precisely modulate the photons from the photon source means, at least one less-reflective target for the photons, the less-reflective target comprising either a solid, a liquid or both, and mounting means for the less-reflective target. At least one gravity-modulation receiver means which is/are in or not in physical contact with the less-reflective target or the mounting means for the less-reflective target. The at least one gravity-modulation receiver means has/have at least one piezo-electric transducer or at least one quartz crystal electrically connected to a differential amplifier or a charge amplifier to amplify the gravity modulation for further signal processing. When the at least one gravity-modulation receiver means is not in physical contact with the less-reflective target or the mounting means for the less-reflective target, the at least one piezo-electric transducer is mechanically loaded with a resonator mass with a natural resonant frequency either equal to, half, one third or one fifth of the frequency of the modulation means; similarly, when not in the physical contact with the less-reflective target or the mounting means for the less-reflective target, the at least one quartz crystal is gravity biased with an appropriately shaped high-density metal biasing piece placed along one direction of the oscillation mode of the at least one quartz crystal having a natural resonant frequency either equal to, one third or one fifth of the frequency of the modulation means.

In the first variation to the first embodiment of the first version of the present invention, the photon source means is either a carbon film resistor, metal film resistor, a thick film resistor, a wire resistor or an electric glow discharge lamp, producing non-coherent photons with the passage of an electric current through the carbon film, metal film, thick film resistor, wire resistor or electric glow discharge lamp; the passage of the electric current is controlled by the modulation means employ/s digital delays or delay lines to appropriately delay the passage of the electric current to all the respective photon source means to precisely modulate the photons from all the respective photon source means to reach the less-reflective target coincidentally. This is done to compensate for the propagation delay in the electronic and electrical circuits leading to the various photon source means and the respective propagation delays of the photons in their travel to the less reflective target.

A further variation to the above described first embodiment of the first version of the present invention has the photon source means has one or more light emitting diode/s producing non-coherent photons or a laser light emitting diode producing coherent photons. The passage of electric current through the one or more light emitting diode/s is controlled by the modulation means which employ/s digital delays or delay lines to effect the passage of the electric current coincidentally to all the photon source means (light emitting diode/s or other means) to precisely modulate the photons from the photon source means to reach the less-reflective target.

A still further variation to the above described first embodiment of the first version of the present invention has the photon source means is an array of xenon-filled or krypton-filled electric glow discharge flash lamps which are fired consecutively, controlled by the modulation means to precisely modulate the photons from the photon source means.

A high-power variation to the above described first embodiment of the first version of the present invention has the photon source means, holding means for the photon source means, the less-reflective target and the mounting means for the less-reflective target are integrated; the simplest form of which is that of a non-inductive conductor or a plurality of non-inductive conductors in parallel or in series as the electromagnetic radiation source means, carrying pulsed electric current from the modulation means; the surrounding medium to the non-inductive conductor is conjoined, fused or potted with the non-inductive conductor, and the surrounding medium receives the photons released by the colliding action of the free electrons having increased drift velocity proportional to the density of the pulsed electric current, $J=I/A$, or, $J=nev_d$, where n is free electron density and $v_d$ is electron drift velocity. As the intensity of gravity modulation produced by the gravity modulator is proportional to the number of photons produced and the inverse square of their distance from the closest atomic nucleus; therefore, even if the photons which are produced by increased electron drift velocity are quickly reabsorbed by other electrons in the conductor, the greater photon number results in a greater number of photons traveling through atomic nucleuses in the non-inductive conductor. Bunching closely together of the plurality non-inductive conductors results in increasing the number of produced photons with a proportional increase in the number of atomic nucleuses, but with proportional increase in free electrons reabsorption of the photons; however, if a non-conductor filler of low density is interspersed amid the plurality of non-inductive conductors without bunching them closely together, much greater gravity modulation is produced, as the produced photons are subjected to a much greater number of atomic nucleuses, while there is not the proportional increase in free electrons.

An arrangement of gravity modulator and gravity-modulation receiver of the present invention in its second version has at least one gravity modulator producing gravity modulation, having at least one photon source means, holding means for the photon source means, modulation means to precisely modulate photons from the photon source means, a less-reflective target for the photons, mounting means for the less-reflective target, and an optical resonant cavity with reflection means for the photons from the photon source means; the target comprising either solid means, liquid means or both; the resonant cavity fully or partially enclosing the photon source means, the modulation means to precisely modulate photons from the photon source means, the less-reflective target for the photons, the holding means for the photon source means and the mounting means for the less-reflective target; and at least one gravity-modulation receiver means in or not in physical contact with the less-reflective target or the mounting means for the less-reflective target; the receiver means having at least one piezo-electric transducer or at least one quartz crystal electrically connected to a differential amplifier or a charge amplifier to amplify the gravity modulation from the modulator for further signal processing; when not in the physical contact with the less-reflective target or the mounting means for the less-reflective target, the at least one piezo-electric transducer loaded with a resonator mass with a natural resonant frequency either equal to, half, one third or one fifth of the frequency of the modulation means; when not in the physical contact with the less-reflective target or the mounting means for the less-reflective target, the at least one quartz crystal gravity biased with a shaped high-density metal biasing piece placed along one direction of the oscillation mode of the at least one quartz crystal having a natural resonant frequency either equal to, one third or one fifth of the frequency of the modulation means.

An arrangement of gravity modulator and gravity-modulation receiver of the present invention in its third version has at least one gravity modulator producing gravity modulation, having at least one electromagnetic radiation source means, holding means for the electromagnetic radiation source means, modulation means to precisely modulate electromagnetic radiation from the electromagnetic radiation source means, a less-reflective target for the electromagnetic radiation, mounting means for the target, a resonant cavity with reflection means for the electromagnetic radiation from the electromagnetic radiation source means; the target comprising either a solid means, a liquid means or both; the resonant cavity either fully, partially or selectively enclosing the electromagnetic radiation source means, the modulation means to precisely modulate electromagnetic radiation from the electromagnetic radiation source means, the less-reflective target for the electromagnetic radiation, the holding means for the electromagnetic radiation source means and the mounting means for the less-reflective target; and at least one gravity-modulation receiver means in or not in physical contact with the less-reflective target or the mounting means for the less-reflective target; the receiver means having at least one piezo-electric transducer or at least one quartz crystal electrically connected to a differential amplifier or a charge amplifier to amplify the gravity modulation from the modulator for further signal processing; the at least one piezo-electric transducer loaded with a resonator mass with a natural resonant frequency either equal to, half, one third or one fifth of the frequency of the modulation means, when not in the physical contact with the less-reflective target; and the at least one quartz crystal gravity biased with a shaped high-density metal biasing piece placed along one direction of the oscillation mode of the at least one quartz crystal having a natural resonant frequency either equal to, one third or one fifth of the frequency of the modulation means, when not in the physical contact with the less-reflective target.

An arrangement of gravity modulator and gravity-modulation receiver of the present invention in its fourth version has at least one gravity modulator producing gravity modulation, having a plurality of electromagnetic radiation source means; holding means for the electromagnetic radiation source means, a plurality of modulation means to precisely modulate electromagnetic radiation from the electromagnetic radiation source means in respective time coordination, a less-reflective target for the electromagnetic radiation, mounting means for the less-reflective target, a cavity with reflection means for the electromagnetic radiation from the electromagnetic radiation source means; the target comprising either a solid means, a liquid means or both; the cavity either fully, partially or selectively enclosing the electromagnetic radiation source means, the modulation means to precisely modulate electromagnetic radiation, the less-reflective target for the electromagnetic radiation, the holding means for the electromagnetic radiation source means and the mounting means for the less-reflective target; heat-removal means to dissipate heat from the electromagnetic radiation source means; the heat-removal means having fluidic media to dissipate the heat; and at least one gravity-modulation receiver means in or not in physical contact with the less-reflective target or the mounting means for the less-reflective target; the receiver means comprising at least one piezo-electric transducer or at least one quartz crystal electrically connected to a differential amplifier or a charge amplifier to amplify the gravity modulation from the modulator for further signal processing; the at least one piezo-electric transducer loaded with a resonator mass with a natural resonant frequency either equal to, half, one third or one fifth of the frequency of the modulation means, when not in the physical contact with the less-reflective target or the mounting means for the less-reflective target; the at least one quartz crystal gravity biased with a shaped high-density metal biasing piece placed along one direction of the oscillation mode of the at least one quartz crystal having a natural resonant frequency either equal to, one third or one fifth of the frequency of the modulation means, when not in the physical contact with the less-reflective target or the mounting means for the less-reflective target.

An embodiment of the fourth version of the present invention has the electromagnetic radiation source means, the holding means for the electromagnetic radiation source, the less-reflective target for the electromagnetic radiation and the mounting means for the target are/is either integrated, fused, conjoined or potted; in such cases, the simplest form is that of a non-inductive conductor as the electromagnetic radiation source means, carrying pulsed electric current from the modulation means; the surrounding medium to the non-inductive conductor is conjoined, fused or potted with the non-inductive conductor, and the surrounding medium receives some electromagnetic radiation consisting also of photons released by the colliding action of the free electrons having increased drift velocity proportional to the density of the pulsed electric current, $J=I/A$, or, $J=nev_d$, where n is free electron density and $v_d$ is electron drift velocity.

An arrangement of gravity modulator and gravity-modulation receiver of the present invention in its fifth version has at least one gravity modulator producing gravity modulation, having at least one photon source, modulation means to precisely modulate the photons from the photon source, holding means for the modulation means to modulate the photons from the photon source, a less-reflective target for the photons, a liquid or both, mounting means for the less-reflective target; the less-reflective target composed of either a solid; and at least one gravity-modulation receiver means in or not in physical contact with the less-reflective target or the mounting means for the less-reflective target. The gravity-modulation receiver means in this fifth version of the present invention has/have at least one piezo-electric transducer or at least one quartz crystal electrically connected to a differential amplifier or a charge amplifier to amplify the gravity modulation from the modulator for further signal processing; the at least one piezo-electric transducer loaded with a resonator mass with a natural resonant frequency either equal to, half, one third or one fifth of the frequency of the modulation means, when not in the physical contact with the less-reflective target or the mounting means for the less-reflective target; the at least one quartz crystal gravity biased with a shaped high-density metal biasing piece placed along one direction of the oscillation mode of the at least one quartz crystal having a natural resonant frequency either equal to, one third or one fifth of the frequency of the modulation means, when not in the physical contact with the less-reflective target or the mounting means for the less-reflective target.

The present invention in all its forms can also be understood in other forms and variations substantially described with reference to the accompanying drawings and in teachings found in the following detailed description, to enable a person ordinarily skilled in the art to attempt modifications fundamentally underpinned by the present invention; therefore, the present invention as disclosed herein and herein further form the basis for many a general modifications without taking away or reducing the strength of the claims which can be best understood in the light of the following detailed description of the invention as well as the theoretical basis, with reference to the various indicia presented in the accompanying drawings.

BRIEF DESCRIPTION OF THE SEVERAL VIEWS OF THE DRAWINGS

Accompanying drawings on one drawing sheet are two in number. Numerals with backslash are employed to identify features and components of the drawings. Numeral indicia to the left of backslash sign \ denote figure number; numeral indicia to the right hand side of backslash sign \ identify a feature. Identical right hand side numerals denote functional and/or positional similarity. Indicia on the extreme right following hyphen sign - denote a subordinate feature to the feature identified by the indicia immediately left to the hyphen sign -.

DETAILED DESCRIPTION OF THE INVENTION

Figure 1:
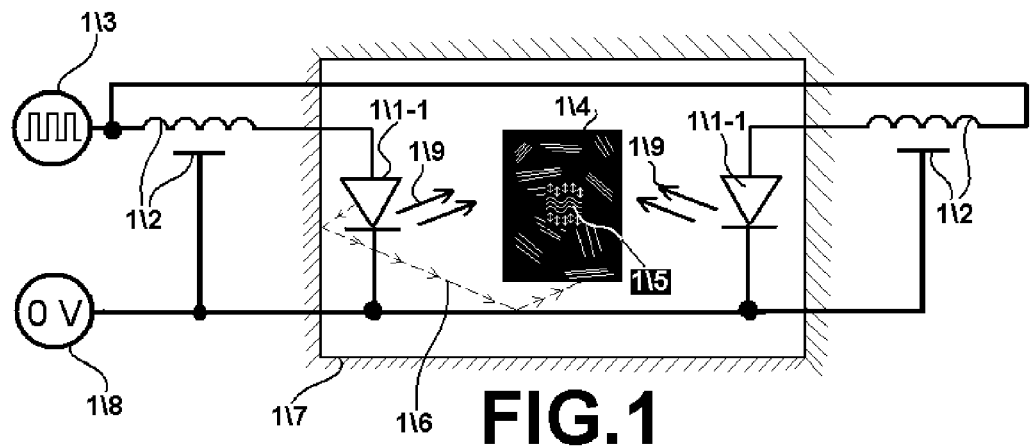
FIG. 1 is a schematic showing the basic conceptual construction and the electronic circuit of the embodiment of the gravity modulator of the present invention, which employs light emitting diodes producing non-coherent photons.
Figure 2:
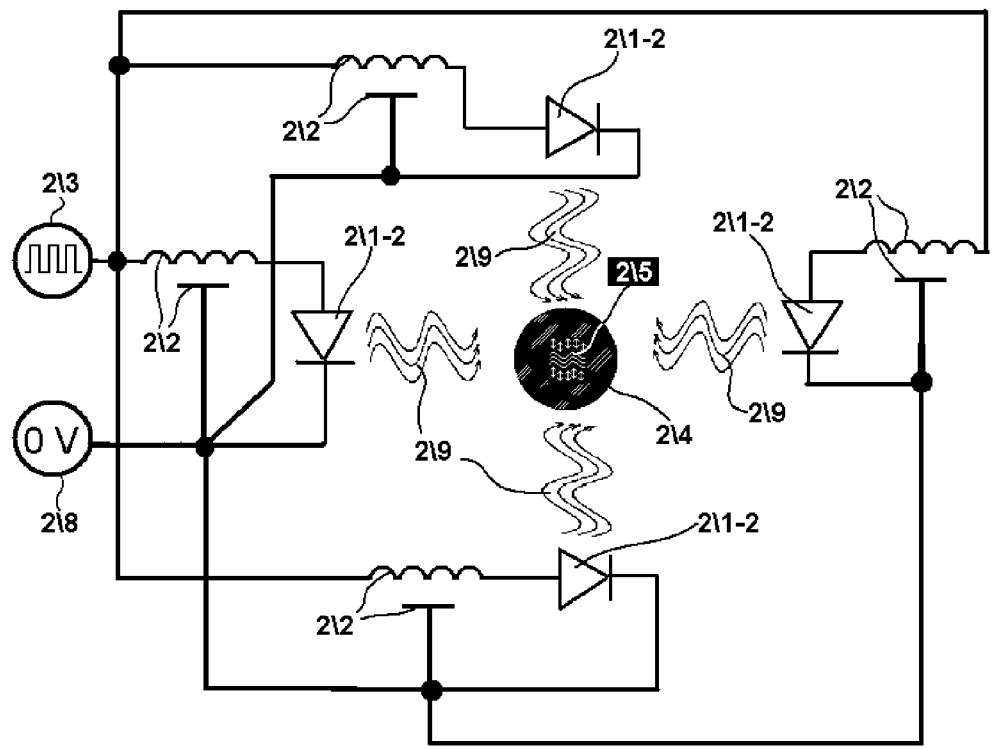
FIG. 2 is a schematic showing the basic conceptual construction and the electronic circuit of the embodiment of the gravity modulator of the present invention, which employs light emitting diodes producing coherent photons
Figure 3:
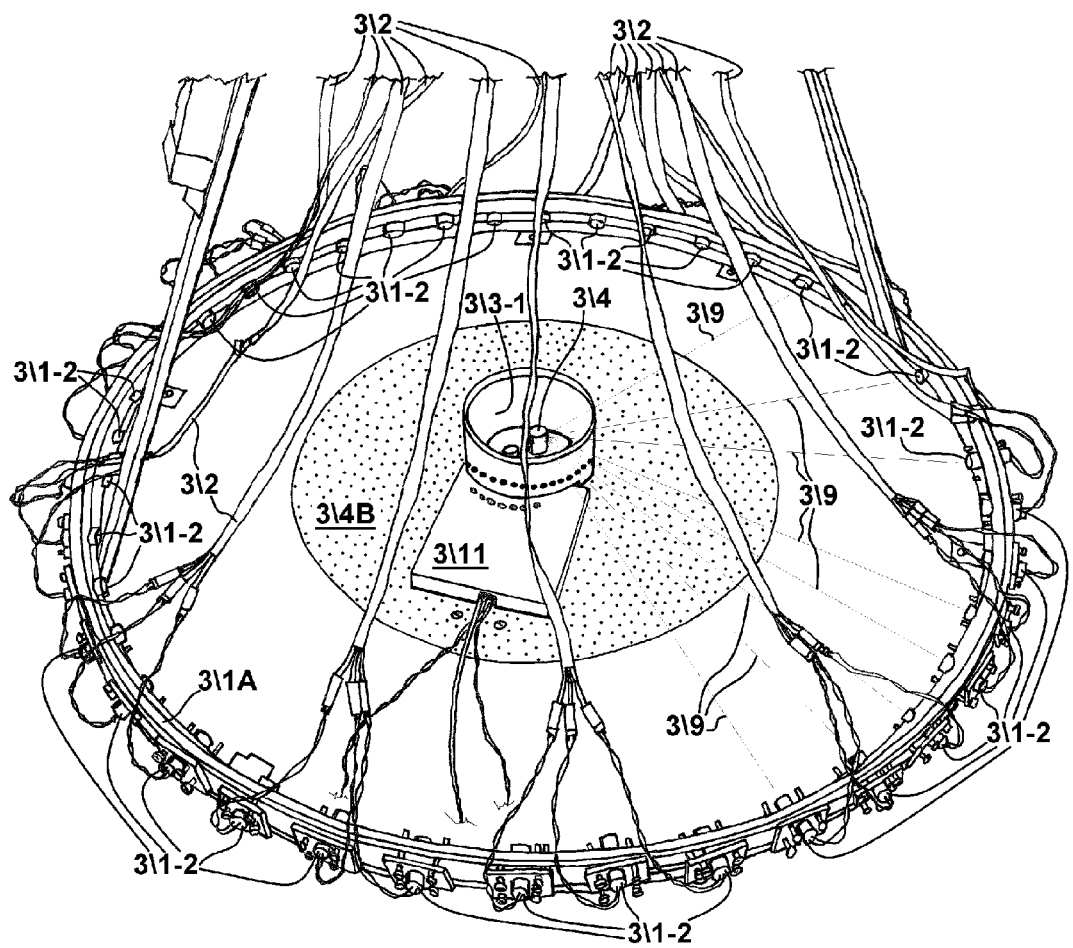
FIG. 3 is a rendition in perspective showing the physical arrangement and construction of the embodiment of the gravity modulator and gravity-modulation receiver of the present invention, which employs radially arranged, equidistance light emitting diodes producing coherent photons in a planar distribution.
Figure 4:
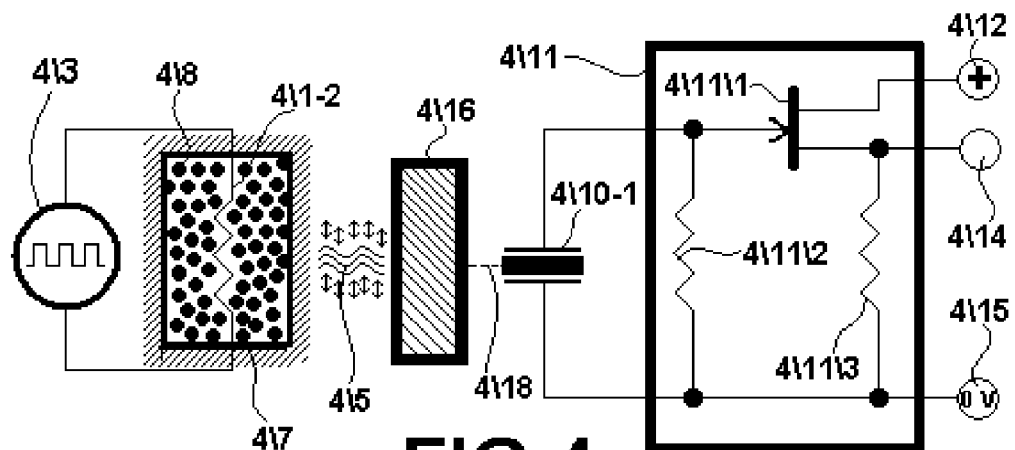
FIG. 4 is a schematic showing the basic conceptual construction and the electronic circuit of the embodiment of the present invention, which in the gravity modulator employs an electrical resistor for producing non-coherent photons and has a gravity-modulation receiver which is not in physical contact with the gravity modulator and has a piezo-electric transducer loaded with a resonator mass.
Figure 5:
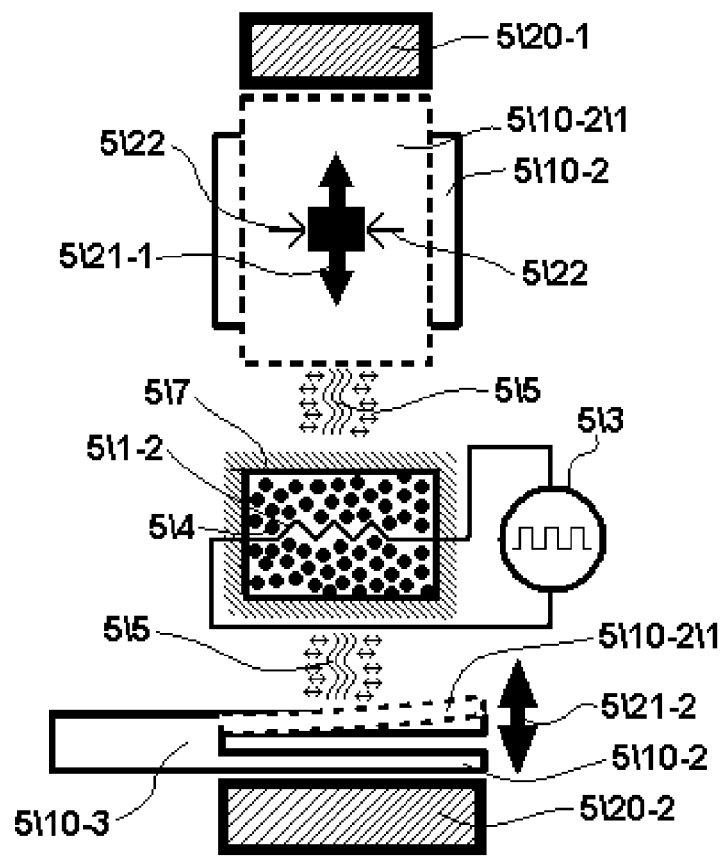
FIG. 5 is a schematic showing the basic conceptual construction of two front end alternatives of the embodiment of the present invention, which has a gravity-modulation receiver not in physical contact with the gravity modulator and has a quartz crystal in the front end which is gravity biased with a shaped high-density metal biasing piece placed along one direction of the oscillation mode of the quartz crystal.

With reference to the above-presented brief summary and discussions, the arrangement of gravity modulator and gravity-modulation receiver of the present invention in the first version is made of at least one gravity modulator (FIG. 1, FIG. 2, FIG. 3, FIG. 4 and FIG. 5) producing gravity modulation 1\5, 2\5, 3\5, 4\5 and 5\5 and at least one gravity-modulation receiver means. The gravity modulator has at least one photon source means 1\1-1, 2\1-2, 3\1-2, 4\1-2, 5\1-2, holding means 3\1A for photon source means 3\1-2, modulation means 1\3, 2\3, 3\3-1, 4\3, 5\3 to precisely modulate the photons from photon source means 1\1-1, 2\1-2, 3\1-2, 4\1-2, at least one less-reflective target 1\4, 2\4, 3\4, 5\4 for the photons, and mounting means 3\4B for the less-reflective target 3\4. Less-reflective target 1\4, 2\4, 3\4, 5/4 composed of either a solid, a liquid or both, At least one gravity-modulation receiver means which is/are in or not in physical contact with less-reflective target 1\4, 2\4, 3\4, 5\4 or mounting means 3\4 for less-reflective target 1\4, 2\4, 3\4, 5\4. At least one gravity-modulation receiver means has/have at least one piezo-electric transducer 4\10-1 or at least one quartz crystal 5\10-2 (including 5\10-2\1) electrically connected to a differential amplifier or charge amplifier 4\11 to amplify gravity modulation 4\5, 5\5 for further signal processing. When the at least one gravity-modulation receiver means is not in physical contact with less-reflective target 1\4, 2\4, 3\4, 5\4 or mounting means 3\4B for less-reflective target 1\4, 2\4, 3\4, 5\4, at least one piezo-electric transducer 4\10-1 is mechanically loaded with resonator mass 4\16 with a natural resonant frequency either equal to, half, one third or one fifth of the frequency of modulation means 4\3; similarly, when not in the physical contact with less-reflective target 1\4, 2\4, 3\4, 5\4 or mounting means 3\4B for less-reflective target 1\4, 2\4, 3\4, 5\4, at least one quartz crystal 5\10-2 (including 5\10-2\1) is gravity biased with an appropriately shaped high-density metal biasing piece 5\20-1, 5\20-2 placed along one direction of the oscillation mode of at least one quartz crystal 5\10-2 having a natural resonant frequency either equal to, one third or one fifth of the frequency of modulation means 5\3. Therefore, from this understanding, the present invention could be utilized for medical and other imaging purposes, as the various densities would show up if a body is placed partially in place of less-reflective target 1\4, 2\4, 3\4, 5\4 or in place of surrounding medium 4\8, in that case, in order to increase the resolution, the number of piezo-electric transducer 4\10-1 or quartz crystal 5\10-2 have to be increased and have to be placed in a matrix form to form a readable image after data processing by a computer.

In the first variation to the first embodiment of the first version of the present invention, photon source means 4\1-2, 5\1-2 is either a carbon film resistor, metal film resistor, a thick film resistor, a wire resistor or an electric glow discharge lamp, producing non-coherent photons with the passage of an electric current through the carbon film, metal film, thick film resistor, wire resistor or electric glow discharge lamp. The passage of the electric current is controlled by modulation means 1\3, 2\3, 4\3, 5\3 and alternatively or also by mechanical modulation means 3\3-1, and may also employ digital delays or delay lines 1\2, 2\2, 3\2 to appropriately delay the passage of the electric current to all the respective photon source means 1\1-1, 2\1-2, 3\1-2, 4\1-2, 5\1-2 to precisely modulate the photons from all the respective photon source means 1\1-1, 2\1-2, 3\1-2, 4\1-2, 5\1-21\1-1 to reach less-reflective target 1\4, 2\4, 3\4, 5\4 coincidentally. This is done to compensate for the propagation delay in the electronic and electrical circuits leading to the various photon source means 1\1-1, 2\1-2, 3\1-2, 4\1-2, 5\1-2 and the respective propagation delays of the photons in their travel to less reflective target 1\4, 2\4, 3\4, 5\4.

The further variation to the above described first embodiment of the first version of the present invention has photon source means 1\1-1, 2\1-2, 3\1-2 provided with one or more light emitting diode/s 1\1-1 producing non-coherent photons 1\9 or laser light emitting diode/s 2\1-2 producing coherent photons 2\9. The passage of electric current through the light emitting diode/s 1\1-1, 2\1-2 is controlled by modulation means 1\3, 2\3, and alternatively also by mechanical modulation means 3\3, and may also employ digital delays or delay lines 1\2, 2\2 to effect the passage of the electric current coincidentally to all photon source means (light emitting diode/s or other means) 1\1-1, 2\1-2, 3\1-2, 4\1-2, 5\1-2 to precisely modulate the photons from photon source means 1\1-1, 2\1-2, 3\1-2, 4\1-2, 5\1-2 to reach the less-reflective target 1\4, 2\4, 3\4, 5\4.

Yet another variation to the above described first embodiment of the first version of the present invention has the photon source means as an array of xenon-filled or krypton-filled electric glow discharge flash lamps which are fired consecutively, controlled by modulation means 4\3, 5\3 with an addition of further digital sequencing circuitry to precisely modulate the photons from the photon source means. This consecutive firing, one after the other, in a sequential manner is done in order not to exceed the safe power limit of the electric glow discharge flash lamps; the array flash lamps are thus made to produce a very high photon emission, in turn producing high levels of gravity modulation.

The high-power variation to the above described first embodiment of the first version of the present invention has photon source means 1\1-1, 2\1-2, 3\1-2, 4\1-2, 5\1-2, holding means 3\1A for photon source means 1\1-1, 2\1-2, 3\1-2, 4\1-2, 5\1-2, less-reflective target 1\4, 2\4, 3\4, 5\4 and mounting means 3\4B for the less-reflective target 1\4, 2\4, 3\4, 5\4 all integrated; the simplest form of which is that of a non-inductive conductor or a plurality of non-inductive conductors in parallel or in series as photon source means 4\1-2, carrying pulsed electric current from modulation means 4\3; surrounding medium 4\8 to the non-inductive conductor is conjoined, fused or potted with the non-inductive conductor. Surrounding medium 4\8 to the non-inductive conductor is conjoined, fused or potted with the non-inductive conductor, and surrounding medium 4\8 receives the radiation consisting of photons released by the colliding action of the free electrons having increased drift velocity proportional to the density of the pulsed electric current, $J=I/A$, or, $J=nev_d$, where n is free electron density and $v_d$ is electron drift velocity. As the intensity of gravity modulation 4\5 produced by the gravity modulator is proportional to the number of photons produced and the inverse square of their distance from the closest atomic nucleus; therefore, even if the photons which are produced by increased electron drift velocity are quickly reabsorbed by other electrons in the conductor, the greater photon number results in a greater number of photons traveling through atomic nucleuses in the non-inductive conductor. Bunching closely together of the plurality non-inductive conductors results in increasing the number of produced photons, with a proportional increase in the number of atomic nucleuses, but with proportional increase in free electrons reabsorption of the photons; however, if a non-conductive filler of low density as surrounding medium 4\8 is interspersed amid the plurality of non-inductive conductors without bunching the conductors closely together, much greater gravity modulation 4\5 is produced, as the produced photons are subjected to a much greater number of atomic nucleuses, while there is not the proportional increase in free electrons. For the non-conductive filler of low density to maximally adhere to the non-inductive conductor, a Mobius resistor could be used as the non-inductive conductor of the present invention. It is also relevant to note that conducting metals with lower atomic mass like aluminum produce greater gravity modulation 4\5 than copper, because of far lesser number of electrons in only a marginally smaller atom (Al atomic number 13<<Cu atomic number 29, Al atomic radius 125 pm<Cu atomic radius 128 pm) intercept less number of photons and the probability of a photon reaching the nucleus is greater. Further, in a smaller atomic idealized nucleus, the surface to volume ratio is greater than in a larger idealized nucleus, which again increases the probability of a photon reaching the idealized nucleus, as more surface in the idealized nucleus is there to receive a photon. Therefore, from this understanding, the present high-power variation of the present invention could be utilized for medical and other imaging purposes, as the various densities and other properties as discussed would show up if a body is placed partially in place of surrounding medium 4\8, in that case, in order to increase the resolution the numbers of piezo-electric transducer 4\10-1 or quartz crystal 5\10-2 have to be increased and have to be placed in a matrix form to form a readable image after data processing by a computer.

The arrangement of gravity modulator and gravity-modulation receiver of the present invention in its second version has at least one gravity modulator (FIG. 1, FIG. 3, FIG. 4 and FIG. 5) producing gravity modulation 1\5, 3\5, 4\5, 5\5, having at least one photon source means 1\1-1, 3\1-2, 4\1-2, 5\1-2, holding means 3\1A for photon source means 1\1-1, 3\1-2, 4\1-2, 5\1-2, modulation means 1\3, 2\3, 3\3, 4\3, 5\3 to precisely modulate photons from photon source means 1\1-1, 3\1-2, 4\1-2, 5\1-2, less-reflective target 1\4, 3\4, 5\4 for the photons, mounting means 3\4B for less-reflective target 1\4, 3\4, 5\4 and an optical cavity (which may be resonant and/or also suitable for electromagnetic radiation in other versions of the present invention) 1\7, 4\7, 5\7 with reflection means (reflected beam 1\6 in FIG. 1) for the photons from photon source means 1\1-1, 3\1-2, 4\1-2, 5\1-2. Less-reflective target 1\4, 3\4, 5\4 composed of either solid means, liquid means or both; optical cavity 1\7, 4\7, 5\7 fully or partially enclosing the photon source means 1\1-1, 3\1-2, 4\1-2, 5\1-2, modulation means 1\3, 2\3, 3\3, 4\3, 5\3 to precisely modulate photons from the photon source means 1\1-1, 3\1-2, 3\1-2, 4\1-2, 5\1-2, less-reflective target 1\4, 3\4, 3\4, 5\4 for the photons, holding means 3\1A for photon source means 1\1-1, 3\1-2, 4\1-2, 5\1-2, mounting means 3\4B for less-reflective target 1\4, 3\4, 5\4. The arrangement of gravity modulator and gravity-modulation receiver of the present invention in its second version also has at least one gravity-modulation receiver means in or not in physical contact with less-reflective target 1\4, 3\4, 5\4 or mounting means 3\4B for less-reflective target 1\4, 3\4, 5\4. The receiver means having at least one piezo-electric transducer 4\10-1 or at least one quartz crystal 5\10-2 electrically connected to a differential amplifier or charge amplifier 4\11 to amplify gravity modulation 1\5, 3\5, 4\5, 5\5 from the gravity modulator for further signal processing. When not in the physical contact with less-reflective target 1\4, 3\4, 5\4 or mounting means 3\4B for less-reflective target 1\4, 3\4, 5\4, at least one piezo-electric transducer 4\10-1 is physically loaded, via load shaft 4\18, with resonator mass 4\16 with a natural resonant frequency either equal to, half, one third or one fifth of the frequency of modulation means 1\3, 2\3, 3\3, 4\3, 5\3; likewise, when not in the physical contact with less-reflective target 1\4, 3\4, 5\4 or mounting means 3\4B for less-reflective target 1\4, 3\4, 5\4, at least one quartz crystal 5\10-2 is gravity biased with a shaped high-density metal biasing piece placed along one direction of the oscillation mode of at least one quartz crystal 5\10-2 having a natural resonant frequency either equal to, one third or one fifth of the frequency of modulation means 5\3.

The arrangement of gravity modulator and gravity-modulation receiver of the present invention in the third version has at least one gravity modulator (FIG. 1, FIG. 2, FIG. 3, FIG. 4 and FIG. 5) producing gravity modulation 1\5, 2\5, 3\5, 4\5, 5\5, having at least one electromagnetic radiation source means, holding means 3\1A for the electromagnetic radiation source means, modulation means 1\3, 2\3, 3\3-1, 4\3, 5\3 to precisely modulate electromagnetic radiation from the electromagnetic radiation source means, less-reflective target 1\4, 2\4, 3\4, 5\4 for the electromagnetic radiation, mounting means 3\4B for less-reflective target 1\4, 2\4, 3\4, 5\4, a cavity (possibly resonant) with reflection means for the electromagnetic radiation from the electromagnetic radiation source means; less-reflective target 1\4, 2\4, 3\4, 5\4 comprising either a solid means, a liquid means or both; the cavity (possibly resonant) either fully, partially or selectively enclosing the electromagnetic radiation source means, modulation means 1\3, 2\3, 3\3-1, 4\3, 5\3 to precisely modulate electromagnetic radiation from the electromagnetic radiation source means, less-reflective target 1\4, 2\4, 3\4, 5\4 for the electromagnetic radiation, holding means 3\1A for the electromagnetic radiation source means and mounting means 3\4B for less-reflective target 1\4, 2\4, 3\4, 5\4; and at least one gravity-modulation receiver means in or not in physical contact with less-reflective target 1\4, 2\4, 3\4, 5\4 or mounting means 3\4B for less-reflective target 1\4, 2\4, 3\4, 5\4. The gravity-modulation receiver means having at least one piezo-electric transducer 4\10-1 or at least one quartz crystal 5\10-2 electrically connected to a differential amplifier or charge amplifier 4\11 to amplify gravity modulation 1\5, 2\5, 3\5, 4\5, 5\5 from the gravity modulator for further signal processing; at least one piezo-electric transducer 4\10-1 physically loaded, via load shaft 4\18, with resonator mass 4\16 with a natural resonant frequency either equal to, half, one third or one fifth of the frequency of the modulation means 1\3, 2\3, 3\3-1, 4\3, 5\3, when not in the physical contact with less-reflective target 1\4, 2\4, 3\4, 5\4; and at least one quartz crystal 5\10-2 gravity biased with a shaped high-density metal biasing piece placed along one direction of the oscillation mode of at least one quartz crystal 5\10-2 having a natural resonant frequency either equal to, one third or one fifth of the frequency of modulation means 5\3, when not in the physical contact with less-reflective target 5\4.

The arrangement of gravity modulator and gravity-modulation receiver of the present invention in the fourth version has at least one gravity modulator (FIG. 1, FIG. 2, FIG. 3, FIG. 4 and FIG. 5) producing gravity modulation 1\5, 2\5, 3\5, 4\5, 5\5, having a plurality of electromagnetic radiation source means; holding means 3\1A for the electromagnetic radiation source means, a plurality of modulation means 1\3, 2\3, 3\3-1, 4\3, 5\3 to precisely modulate electromagnetic radiation from the electromagnetic radiation source means in respective time coordination, less-reflective target 1\4, 2\4, 3\4, 5\4 for the electromagnetic radiation, mounting means 3\4B for less-reflective target 1\4, 2\4, 3\4, 5\4, a cavity with reflection means for the electromagnetic radiation from the electromagnetic radiation source means; less-reflective target 1\4, 2\4, 3\4, 5\4 comprising either a solid means, a liquid means or both; the cavity either fully, partially or selectively enclosing the electromagnetic radiation source means, modulation means 1\3, 2\3, 3\3-1, 4\3, 5\3 to precisely modulate electromagnetic radiation, less-reflective target 1\4, 2\4, 3\4, 5\4 for the electromagnetic radiation, holding means 3\1A for the electromagnetic radiation source means and mounting means 3\4B for less-reflective target 1\4, 2\4, 3\4, 5\4. The present version of the present invention also has heat-removal means to dissipate heat from the electromagnetic radiation source means; the heat-removal means having fluidic media to dissipate the heat; and at least one gravity-modulation receiver means in or not in physical contact with less-reflective target 1\4, 2\4, 3\4, 5\4 or mounting means 3\4B for less-reflective target 1\4, 2\4, 3\4, 5\4. The receiver means has/have at least one piezo-electric transducer 4\10-1 or at least one quartz crystal 5\10-2 electrically connected to a differential amplifier or charge amplifier 4\11 to amplify gravity modulation 1\5, 2\5, 3\5, 4\5, 5\5 from the modulator for further signal processing; at least one piezo-electric transducer 4\10-1 physically loaded, via load shaft 4\18, with resonator mass 4\16 with a natural resonant frequency either equal to, half, one third or one fifth of the frequency of modulation means 1\3, 2\3, 3\3-1, 4\3, 5\3, when not in the physical contact with less-reflective target 1\4, 2\4, 3\4, 5\4 or mounting means 3\4B for less-reflective target 1\4, 2\4, 3\4, 5\4; in a similar situation, at least one quartz crystal 5\10-2 gravity biased with a shaped high-density metal biasing piece placed along one direction of the oscillation mode of at least one quartz crystal 5\10-2 having a natural resonant frequency either equal to, one third or one fifth of the frequency of modulation means 1\3, 2\3, 3\3-1, 4\3, 5\3, when not in the physical contact with less-reflective target 1\4, 2\4, 3\4, 5\4 or mounting means 3\4B for less-reflective target 1\4, 2\4, 3\4, 5\4.

In an embodiment of the fourth version of the present invention, the electromagnetic radiation source means 4\1-2, holding means 3\1A for the electromagnetic radiation source, less-reflective target 1\4, 2\4, 3\4, 5\4 for the electromagnetic radiation and mounting means 3\4B for target 1\4, 2\4, 3\4, 5\4 are either integrated, fused, conjoined or potted together; the simplest form of which is that of a non-inductive conductor or a plurality of non-inductive conductors in parallel or in series as electromagnetic radiation source means 4\1-2, carrying pulsed electric current from modulation means 4\3; surrounding medium 4\8 to the non-inductive conductor is conjoined, fused or potted with the non-inductive conductor. Surrounding medium 4\8 to the non-inductive conductor is conjoined, fused or potted with the non-inductive conductor, and surrounding medium 4\8 receives the electromagnetic radiation released by the colliding action of the free electrons having increased drift velocity proportional to the density of the pulsed electric current, $J=I/A$, or, $J=nev_d$, where n is free electron density and $v_d$ is electron drift velocity. As the intensity of gravity modulation 4\5 produced by the gravity modulator is proportional to the electromagnetic radiation produced and the inverse square of their distance from the closest atomic nucleus; therefore, even if the electromagnetic which are produced by increased electron drift velocity is quickly reabsorbed by other electrons in the conductor, the greater electromagnetic radiation results in a greater electromagnetic radiation traveling through atomic nucleuses in the non-inductive conductor. Bunching closely together of the plurality non-inductive conductors results in increasing the electromagnetic radiation, with a proportional increase in the number of atomic nucleuses, but with proportional increase in free electrons reabsorption of the electromagnetic radiation; however, if a non-conductive filler of low density as surrounding medium 4\8 is interspersed amid the plurality of non-inductive conductors without bunching the conductors closely together, much greater gravity modulation 4\5 is produced, as the produced electromagnetic radiation is subjected to a much greater number of atomic nucleuses, while there is not the proportional increase in free electrons. For the non-conductive filler of low density to maximally adhere to the non-inductive conductor, a Mobius resistor could be used as the non-inductive conductor of the present invention. It is also relevant to note that conducting metals with lower atomic mass like aluminum produce greater gravity modulation 4\5 than copper, because of far lesser number of electrons in only a marginally smaller atom (Al atomic number 13<<Cu atomic number 29, Al atomic radius 125 pm<Cu atomic radius 128 pm) intercept less electromagnetic radiation and the probability of the electromagnetic radiation reaching the nucleus is greater. Further, in a smaller atomic idealized nucleus, the surface to volume ratio is greater than in a larger idealized nucleus, which again increases the probability of the electromagnetic radiation reaching the idealized nucleus, as more surface in the idealized nucleus is there to receive the electromagnetic radiation. Therefore, from this understanding, the present invention could be utilized for medical and other imaging purposes, as the various densities and other properties as discussed would show up if a body is placed partially in place of surrounding medium 4\8, in that case, in order to increase the resolution the numbers of piezo-electric transducer 4\10-1 or quartz crystal 5\10-2 have to be increased and have to be placed in a matrix form to form a readable image after data processing by a computer.

The arrangement of gravity modulator and gravity-modulation receiver of the present invention in the fifth version has at least one gravity modulator (FIG. 1, FIG. 2, FIG. 3, FIG. 4 and FIG. 5) producing gravity modulation 1\5, 2\5, 3\5, 4\5 and 5\5, having at least one photon source (either celestial, natural or man-made), modulation means 1\3, 2\3, 3\3-1, 4\3, 5\3 (especially 3\3-1) to precisely modulate the photons from the photon source, holding means 3\1A for modulation means 1\3, 2\3, 3\3-1, 4\3, 5\3 to modulate the photons from the photon source, less-reflective target 1\4, 2\4, 3\4, 5\4 for the photons, mounting means 3\4B for less-reflective target 1\4, 2\4, 3\4, 5\4. Less-reflective target 1\4, 2\4, 3\4, 5\4 is made either of a solid, a liquid, both or even a mixture of many solids and liquids. The arrangement of gravity modulator and gravity-modulation receiver of the present invention in the fifth version also has at least one gravity-modulation receiver means in or not in physical contact with less-reflective target 1\4, 2\4, 3\4, 5\4 or mounting means 3\4B for less-reflective target 1\4, 2\4, 3\4, 5\4. The at least one gravity-modulation receiver means having at least one piezo-electric transducer 4\10-1 or at least one quartz crystal 5\10-2 electrically connected to a differential amplifier or charge amplifier 4\11 to amplify the gravity modulation 1\5, 2\5, 3\5, 4\5, 5\5 from the modulator for further signal processing. The at least one piezo-electric transducer 4\10-1 mechanically loaded via load shaft 4\18 with a resonator mass 4\16 which has a natural resonant frequency either equal to, half, one third or one fifth of the frequency of the modulation means 1\3, 2\3, 3\3-1, 4\3, 5\3, when not in the physical contact with the less-reflective target 1\4, 2\4, 3\4, 5\4 or the mounting means 3\4B for less-reflective target 1\4, 2\4, 3\4, 5\4; in a similar situation, when not in the physical contact with less-reflective target 1\4, 2\4, 3\4, 5\4 or mounting means 3\4B for less-reflective target 1\4, 2\4, 3\4, 5\4, at least one quartz crystal 5\10-2, 5\10-3 gravity biased with a shaped high-density metal biasing piece placed along one direction of the oscillation mode of at least one quartz crystal 5\10-2, 5\10-3 having a natural resonant frequency either equal to, one third or one fifth of the frequency of modulation means 1\3, 2\3, 3\3-1, 4\3, 5\3. Gravity biasing of quartz crystal 5\10-2, 5\10-3 is done in order to effect very minute physical deformation 5\10-2\1 in respective shear mode 5\22 under the influence of gravity modulation 1\5, 2\5, 3\5, 4\5, 5\5. Regarding charge amplifier 4\11 which is electrically connected to piezo-electric transducer 4\10-1 or quartz crystal 5\10-2 to amplify gravity modulation 1\5, 2\5, 3\5, 4\5, 5\5 from the modulator for further signal processing, it may at least consist field effect transistor (FET) 4\11\1, gate-to-source resistor 4\11\2 to sink dangerous high voltage spikes, load resistor 4\11\3, positive dc supply 4\12 to the drain of FET 4\11\1, dc supply zero volt 4\15 and charge amplifier output 4\14.

In order to understand the theoretical and experimental understanding of the discovery by the present inventor, which forms the basis of the present invention, the following needs to be explained. The photons from the photon source when pass through the less-reflective target, they are either picked up by the orbiting electron of the atoms of the less-reflective target and many others are released after initial excitation, or pass unhindered to travel through the less-reflective target. Therefore, all the photons that are picked up by the orbiting electrons are gradually released in gradually reducing numbers of infrared photons, after the photons from the photons are brought to a stop by the modulation means. However, as the photons pass from the photon source through the less-reflective target, when the photons from the photon source are emitted, some (for example, less than 0.01 millionth of chance of a photon hitting the nucleus of helium, looking at the difference between the atomic radius and the nuclear radius) of the photons pass through the atomic nucleuses of the photon source through the less-reflective target.

The more often used exact equation for gravitational red-shift applies to the case outside of a non-rotating, uncharged mass which is spherically symmetric. The equation is:

$$z = (\lambda_o - \lambda_e)/\lambda_e$$

Where
$\lambda_o$ is the wavelength of the electromagnetic radiation or photon as measured by the observer,
$\lambda_e$ is the wavelength of the electromagnetic radiation or photon, when measured at the source of emission,
and also
$z = [1/\sqrt{1 - \{(2GM)/(rc^2)\}}] - 1$ where (considering the equation for inside a proton)
G is the gravitational constant,
M is the mass of the object creating the gravitational field,
r is the radial coordinate of the observer (which is analogous to the classical distance from the center of the object, which we consider first; however, r is mostly considered a Schwarzschild coordinate in the family of nested round spheres, which we consider next), and
c is the speed of light,
$M = 1.67262158 \times 10^{-27}$ kilogram, $r = 0.8 \times 10^{-15}$ meter, $G = 6.673^{-11}$ which is multiplied by $1.6666 \times 10^{38}$ which is roughly the ratio of the strong nuclear force (strong interaction coupling constant g) to G; so, we get an assumed value of G, which is $G_n = 1.1121 \times 10^{28}$ for the strong nuclear force which actually acts in vacuum between the quarks and is expressed as gluon in QCD,
So, by the second equation, putting $G_n$ in place of G, the value of $z = 0.44$;
Similarly, for $r = 10^{-16}$,
the value of $z = (1/\sqrt{-3}) - 1$
or, $z = \{1/(i\sqrt{3})\} - 1$ or, $z=-0.42$ (while, disregarding the bottom side number i being determined indefinitely for an imaginary number under square root)

If Schwarzschild coordinate is considered with a simplified equation, $z_{approx}=(GM)/(r_s c^2)$, where $r_s=$Schwarzschild radius and $r_s=(2GM)/(c^2)$ with the assumed value of $G_n$ put in place of G, $z_{approx}=0.17$ Therefore, it is not entirely untenable to assume that under the influence of the strong nuclear force, deep inside the atomic nucleus, the photons may undergo change of wavelength; in the regions of very high strong nuclear force the distortion of the photons is so great as to turn them into having a negative wavelength of uncertain and fluctuating frequency. Experiments conducted by the inventor seem to indicate such a transformation, as in two different experimental procedures, static as well as modulatory gravity differences were consistently observed. In the first experimental procedure, when multiple (40 Nos. with total power of nearly 0.4 W combined output) red ($\approx$630 nm) laser beams 3\9 (FIG. 3) were aimed at a mirrored glass cylinder (less reflective target 3\4 in FIG. 3, 9 mm diameter, 4.2 mm height, 270 mg) with its top and bottom mirrored, a graphite slug measuring 2.17 mm diameter×0.87 mm height (approximate weight 7.24 mg) loaded on a condenser capsule microphone diaphragm, the mirrored glass cylinder sealed to the top of the microphone with black RTV hard rubber, the weight of the graphite slug reduced slightly to increase the sensitivity of the capsule microphone (Panasonic or equiv. WM-034 series) by 2 dB to an ambient tone of 5.3 kHz produced by a piezoelectric buzzer facing down, kept at a distance of 0.35 meter perpendicularly up from the capsule microphone. The output from the capsule microphone (with another matched microphone similarly loaded and sealed was differentially connected to cancel common mode noise, similarly housed but without any aimed laser) was amplified by preamplifier 3\11 (FIG. 3) with a low noise input stage consisting of transistor MMBR941 (Motorola). Any possible stray photons emitted by the mirrored layers of the mirrored glass cylinder would have pushed the graphite slug downwards and thus would have effected damping, reducing the sensitivity of the capsule microphone to the ambient tone. Further, in an earlier experiment the graphite slug height was 0.72 mm and the sensitivity was never more than 1 dB; an increase of 0.15 mm, resulted in a clear increase in sensitivity, while the gap between the bottom mirrored layer and the upper surface of the graphite slug reduced from 0.18 mm to 0.03 mm; as the height of the glass cylinder was 4.2 mm and the laser beams were centered 1.4 mm below the vertical center of the glass cylinder with approximate spot diameter being 2 mm, following the inverse square law of photometry, if the source of radiation were the bottom mirrored layer, the increase in the photonic push would have been nearly (0.18 mm/0.03 mm)$^2$ or nearly 15 dB; however, if a gravitational radiation from the center of the laser beam spots is considered, the increase in that radiation would have been nearly (0.88 mm/0.73 mm)$^2$ or nearly 1.6 dB which is in agreement with the experimental result of 2 dB.

Subsequent to the experiment, in another experiment, a gravity modulator of the present invention produces gravity modulation of sizable magnitude as to produce an 8 dB signal on a spectrum analyzer even when fully rested on four identical piezoelectric transducer connected in summing mode to cancel out any asymmetrical vibrations; the gravity modulation also enabled reception of the modulation at a distance, as disclosed herein. It is pertinent to note that in a gravity modulator of the present invention, having photon source means 4\1-2 in the form of a non-inductive conductor, surrounding medium 4\8 and optical cavity 4\7 (or electromagnetic radiation cavity) (all in FIG. 4), it is important to observe the orientation and location of the non-inductive conductor inside optical cavity 4\7 with reference to surrounding medium 4\8, in order to effectively receive gravity modulation when the gravity modulator of the present invention is fully rested on four identical piezoelectric transducers connected in summing mode. The front end of the charge amplifier was symmetrically constructed, inside tuner-like housing, as a low noise differential amplifier with one input left floating for rejection of common mode noise. The speed of sound in surrounding medium 4\8 and the walls of optical cavity 4\7 determines the time taken for gravity modulation to reach the piezoelectric transducers, because mass changes in gravity modulation in photon source means 4\1-2 and surrounding medium 4\8 in the vicinity of photon source means 4\1-2 is transferred mechanically as downward pressure change to the piezoelectric transducers. If the non-inductive conductor occupies most of the space inside optical cavity 4\7, then the constraints of speed of sound become less in case of somewhat lower side (1 kHz to 8 kHz) of VLF gravity modulation, as gravity modulation can reach the piezoelectric transducers without much delay due to shorter path of mechanical travel of pressure changes due to gravity modulation. Generally, for a small sized non-inductive conductor bundled together to function as photon source means 4\1-2 located near the center of mass (CM) of optical cavity 4\7, the optimal frequency for gravity modulation is nearly half of the inverse of the time taken for sound to traverse the distance from the CM to the piezoelectric transducers, so that the pulses from modulation means 4\3 are adequately time spaced for downward pressure increase and decrease due to gravity modulation to reach the piezoelectric transducers with the delay equal to the time taken for sound to traverse the distance from the areas of downward pressure increase and return to normal inside optical cavity 4\7 to the elements of piezoelectric transducers. For example, during experiments, an optimal fundamental frequency of 1.68 kHz was found empirically for the overall height of optical cavity 4\7 (constructed of 1.6 mm mild steel sheet and tightly packed with 0.1 mm average grained magnetically separated non-magnetic stone dust as surrounding medium 4\8) being 0.32 meter and the height of non-inductive conductor bundled together being 0.2 meter, with the non-inductive copper conductor bundle centered vertically at the CM. Considering an approximate distance of 0.185 meter from the CM to the elements of piezoelectric transducers and speed of sound in steel being 6100 m/s, the optimal maximum fundamental frequency turns out to be 1.65 kHz which is in good agreement with the experimental result.

Inasmuch, going by Plank relation $E=h\nu$ or $E=hc/\lambda$, negative wavelength or frequency has two possibilities, one, a wave with negative time, two, a wave with negative energy (or we call it negative momentum in particle terms); in existential time, only a wave with negative energy has any measurable significance; this wave of fluctuating frequency and with negative energy is manifested as gravity in various physical phenomena. However, the possibility of negative time too needs further exploration, as such a wave would also mean waves traveling from an origin but traveling back in time further than its origin. When the negative energy waves hit any electron or nucleus, and if they themselves are not retransformed in positive momentum waves by the strong nuclear force or other forces, there is a negative acceleration or what is manifested as gravitational attraction between the bodies having mass. Strong nuclear force itself has origins in the same phenomenon: As the quarks collide, the force at the impact of the collision is of the order of the strong nuclear force and at that moment the quarks which collide, as waves, their front ends transform into negative frequency waves; the negative time immediately makes the front ends retract, reducing the force of collision and thus retransforming the front ends in normal positive frequency waves; in the meantime, the remaining wavelength of the colliding quarks undergo the collision and negative wave transformation as described. What happens to a negative wavelength is that the wave travels to the past—that is the future of this altered time frame. The logical time arrow counterpart, the past, is a wave coming from future. Due to finiteness of light's speed, all the waves reach an observer from the past; the possibility of such a wave coming from future does not exist, unless the speed of such a wave is either infinite or the conventional arrow of time is reversed for such a wave. However, a normal wave in our current frame of time progression could be termed as the past frame of herein conceptualized frame of time. Therefore the actions taking place deep inside gluons inside a nucleus are time reversed and the probable action of repulsion between quarks goes into the past, so it never happens. This seems to be the action of what is termed as the strong nuclear force. Viewed in momentum frame, the momentums of the quarks (a product of mass) with which they were pushed close are also reversed and perform attraction, unlike repulsion after a Newtonian collision of macroscopic bodies. Therefore, the quarks lose their own masses as long as they remain with the gluon in a nucleus, waiting to regain their masses after the destabilization of the gluon. Or gluon is made out of the quarks themselves and also has the combined masses of the quarks as long as the quarks are bound with the gluon. Further, stability is maintained because in $\sqrt{-x}=i\sqrt{x}$ (i being determined indefinitely, for instance, the Riemann surface of the complex square root could be used to understand it) is not continuous and takes infinitely long to determine; whereas, quarks need a definitive frequency to emerge as quantum particles. The formation of secondary negative energy waves is by the not continuous fluctuations to the value of negative wavelength in gluons. These secondary negative energy waves also form gravitational fields, and eventually results in the very slow decay (half-life≈$10^{34}$ years) of the proton. If there are no fluctuations or if the fluctuations are continuous, no secondary negative energy waves will be formed in the absence of any photons traveling through the deep regions of atomic nucleus. This is what seems to be happening in Bose-Einstein condensate, where the photons or non-quantum waves trapped inside the time reverse gluons lose so much of energy that the energy of the negative energy waves also reduce in the near absence of photons traveling through the atomic nucleuses, which gives the condensate strange properties like being friction free. Unexplainable experimental observations by the JILA (University of Colorado) team in 2000 on Bose-Einstein condensates could be explained in the time reversal framework postulated herein. The sudden disappearance of many molecules from the experimental setup could be understood as an intermittent disappearance of the time reversal framework, when wave energy is reduced and a slope in the external magnetic field produces a wave in the gluons, which cancels the negative wavelength wave for even a briefest moment. Therefore, it is to be said that gluons are time reversal trapped waves of the energy which makes quarks collide to form a proton; and that is why they cannot ever be found in a free state. The nearest that we could get to freeing gluons was the unexplained event during JILA team experiment mentioned hereinabove. All the gravity modulation utilizing photons in the present invention generally could be produced at a much lower frequency compared to the natural frequency of the photons, the natural frequency of the photons being the basis of the definable but indeterminable carrier frequency of gravity waves which follow the Riemann surface of the complex square root. However, the natural frequency of certain photons could be used as the gravity-modulation frequency, if well-matched coherent photons reach the less-reflective target which is in the form of a very thin membrane, especially, if made of gold or graphite, because of their lending well to the desired shape and their higher densities. The thin membrane allows nearly one passage of one photon through the nucleuses of the thin membrane, thereby producing a burst of gravity modulation with a burst of coherent photons, creating a gravity-modulation frequency quite matched to the natural frequency of the coherent photons. The definable but indeterminable carrier frequency of gravity waves render themselves useless for any frequency modulation, and all the modulation that can be achieved is to do with their intensity which would only be a higher number of photons of a negative wavelength of uncertain and fluctuating frequency. Although, these photons of a negative wavelength of uncertain and fluctuating frequency can be termed as gravitons at this stage, it would be long before the current theoretical origins of gravitons are matched to the phenomenon of these photons of a negative wavelength of uncertain and fluctuating frequency. The reason behind all the unsuccessful attempts to capture the graviton as postulated by the current study of quantum mechanics seems to be apparent: no photon of negative wavelength of uncertain and fluctuating frequency could ever be captured an orbiting electron in any atom; however, the electron cloud formed around the nucleus seems to be formed by the interference of these photons of a negative wavelength of uncertain and fluctuating frequency with the orbiting electrons. It is also possible to explain a quantum which forms the very foundation of the theory of quantum mechanics, with the help of the interaction between the weak nuclear force, these photons of a negative wavelength of uncertain and fluctuating frequency; although, Planck constant is still one of the few most imprecisely estimated ones, the origin of quanta is actually due to the interaction between the negative wavelength waves as described here and an approaching photon, in which due to stretching of time and consequent intense redshift, the approaching photon only of a certain wavelength range can slow down close to the frequency of the orbital electron in the electron cloud and is assimilated due to the synchrony of the two; the size of an electron cloud is determined by the so called mass of the electron and, again, by the interactions of the mass with fluctuating intensity and frequency of the multitudes of negative wavelength waves emanating from the nucleus, which are temperature dependant as shown in Bose-Einstein condensate; as the negative wavelength waves are more concentrated near the nucleus, the electron clouds form smaller and tighter shells near the nucleus. For instance, in a muonic atom, a muon-based shell is much smaller and hence its q-value is quite different from that of electron (a fermion). A simple illustration to quantum is a Schmitt trigger in engineering electronics; the cloud around the nucleus is determined by the so called masses of the nucleus and the mass(es) of the electron(s) in the shell, formed by the mutual interaction between the nucleus and the electron(s) through multitudes of negative wavelength waves of the present discovery and invention; any photon from outside the shell cannot interfere or alter the mutual interaction between the nucleus and electron(s); and if the photon crosses the shell and the nucleus it itself mostly alters indistinguishable in a negative wavelength wave; so, only an approaching photon, of certain frequencies as earlier explained, which undergoes the intense redshift to match the frequency of the orbital electron in the electron cloud is assimilated due to the synchrony of the two; a casual electron of any other frequency can only bring about perturbations in the cloud by the gravitational modulation of the present discovery, even a part of a photon may get altered under the influence of even the small electronic mass and add to the multitudes of negative wavelength waves in the electron cloud. Another noteworthy feature of these photons of a negative wavelength of uncertain and fluctuating frequency is that their frequency being uncertain and fluctuating they produce indeterminate bursts of wave shapes corresponding to very high frequency photons of the gamma ray region; these wave shapes being part of a photon of a negative wavelength of uncertain and fluctuating frequency cannot be picked up by an electron but in their inter-photon interactions with similar photons of a negative wavelength of uncertain and fluctuating frequency, minute sub electronic transitory or stable masses are produced, which form the dark matter and while decaying produce the dark energy of the universe. It has to be understood in the peculiar nature of the negative and fluctuating frequency of these photons, as there are transient high energy bursts in these photons when their fluctuating frequency increases considerably; as in Planck relation E=hv, the energy of a photon is proportional to its frequency as an electromagnetic wave; therefore, collisions of high energy bursts of two such photons shall produce minute sub electronic masses which not only explain the origin of dark matter but also may explain the presence of an irregular medium (earlier untenably considered to be luminiferous ether) in the so called vacuum of the universe. More and more energy gradually gets transformed into dark matter and but in this manner, the density of the so called vacuum of the universe may rise with many possible changes, the most apparent being changes in the speed of light through vacuum and finally aiding the destruction of all the normal photons of positive wavelength; but at the same time, when a photon with indeterminate negative wavelength again passes through the central regions of a proton, it is reconverted into a normal photon due to the same forces of $G_n$ (or g); however, the wavelength would still remain distorted and indeterminate, thus rendering the reconverted photon mostly ineffective in being captured by an electron; although, the probability does exist. Similarly, the rise in dark matter may have resulted in clumping together of dark matter into dense masses of sub quantum nature, where in sub quantum or non-quantum interactions mass and energy coexist. It is also pertinent to note that any photons purity of wavelength has no final proof; the only way to know about a photon is by it having been captured by an electron and by the raised energy levels of that electron. Even a photon whose waveform is partially (but not sufficiently) distorted due to interactions with dark matter may get captured by an electron, and we may never come to know about its distorted form as such. Finally, as evident from the discussion, sub quantum transformations inside nucleus continue, in spite even of a mass having been at absolute zero. The present discovery and the following invention have found the link between the quantum determinism and its transformation into quantum indeterminism as a photon crosses certain central regions of a proton. QCD has to expand to try to encompass the fluctuations of photonic wavelengths traversing the Riemann surface even in repeated successions, as a nuclear transformed photon which acquired an indeterminate and fluctuating negative wavelength happens to cross a proton repeatedly and the minute sub quantum waves from the destruction of dark matter (whose origin we discussed in earlier lines) also cross those very central regions of a proton. The discussion does not intend to show the limitations of quantum mechanics or its more evolved theoretical form in QCD, but aims to expand it further by showing the conduit between what appears to be 'continuous' and what is 'discontinuous' or quantum linked. The science of imaginary numbers needs to be worked out in much greater detail, especially, with the present-day voluminous computing ability.

From the preceding discussion, it may now be possible to understand the workings of all the forms of the present invention with the help of the fundamental physical mechanisms as explained and which are behind the workings. Additionally, it is pertinent to mention that conventional gravitational wave detectors in the form of Weber bars constantly pick up man-made gravitational modulation and discount the signals as noise, while interferometry is unable to detect anything, as the assumption of a passing gravitational wave slightly stretching one arm as it shortens the other is erroneous—gravitational waves, as explained here, interfere with space only as much as normal photons do.

The present invention has been possible only after the theoretical understanding and discovery as elaborated hereinabove. Although, since the $17^{th}$ century, Le Sage's theory of gravitation, a kinetic theory of gravity originally proposed by Nicolas Fatio in 1690 had been studied and continually reconsidered by many non-mainstream investigators till as recently as in 2007 (by Edwards) and also generally been repeatedly rejected, there was little effort to experimentally or theoretically consider or show as such the existence of photons converted into ones with indeterminate negative momentum, even with the present understanding of QCD and the existence of the strong nuclear force, prior to the present disclosure of the present invention. Only, a few worked on nuclear Compton scattering (Christillin, 1986) and explored the possibility of using Compton scattering as an information-gathering tool for nuclear dynamics. However as late as in 2001, Warkentin et al noted 'ambiguities' in their results, which were actually due to the photons undergoing the changes inside the nucleus as disclosed here. The presently discovered phenomenon of gravity modulation by the present inventor, as disclosed hereinbefore, which forms the theoretical basis of the present invention, had long been hidden in the three intertwined phenomena of the photoacoustic effect, electromagnetism and the photonic push; therefore, it had long been missed also due to inconclusive pursuits in the experiments on nuclear Compton scattering (if only the target mass were tested for mass fluctuations); and, consequently, an arduous long search for classical quantum-mechanics graviton or the Higgs boson was undertaken by the scientific community, without any results. It is essential that the present invention in all its forms must be understood in other forms and variations substantially described with reference to the accompanying drawings and in the teachings found in the preceding and following description and claims of the preferred embodiments, to enable a person ordinarily skilled in the art to attempt modifications fundamentally underpinned by the knowledge in the present invention; therefore, the present invention as disclosed herein and herein further may form the basis for many a general modifications without taking away or reducing the strength of the claims which can be best understood in the light of the present detailed description with the help of the accompanying drawings.

I claim:

1. An arrangement of gravity modulator and gravity-modulation receiver comprising:
    at least one gravity modulator producing gravity modulation, having at least one photon source means, holding means for said photon source means, modulation means to precisely modulate the photons from said photon source means, at least one less-reflective target for said photons, said less-reflective target comprising either a solid, a liquid or both, and mounting means for said less-reflective target; and at least one gravity-modulation receiver means in or not in physical contact with said less-reflective target or said mounting means for said less-reflective target;

said at least one gravity-modulation receiver means having at least one piezo-electric transducer or at least one quartz crystal electrically connected to a differential amplifier or a charge amplifier to amplify said gravity modulation for further signal processing;

when not in said physical contact with said less-reflective target or said mounting means for said less-reflective target, said at least one piezo-electric transducer loaded with a resonator mass with a natural resonant frequency either equal to, half, one third or one fifth of the frequency of said modulation means;

when not in said physical contact with said less-reflective target or said mounting means for said less-reflective target, said at least one quartz crystal gravity biased with a shaped high-density metal biasing piece placed along one direction of the oscillation mode of said at least one quartz crystal having a natural resonant frequency either equal to, one third or one fifth of the frequency of said modulation means.

2. An arrangement of gravity modulator and gravity-modulation receiver in accordance with claim 1, wherein said photon source means is either a carbon film resistor, metal film resistor, a thick film resistor, a wire resistor or an electric glow discharge lamp, producing non-coherent protons with the passage of an electric current through said carbon film, metal film, thick film resistor, wire resistor or electric glow discharge lamp; said passage of said electric current controlled by said modulation means to precisely modulate the photons from said photon source means.

3. An arrangement of gravity modulator and gravity-modulation receiver in accordance with claim 1, wherein said photon source means is a light emitting diode producing non-coherent photons or a laser light emitting diode producing coherent photons.

4. An arrangement of gravity modulator and gravity-modulation receiver in accordance with claim 1, wherein said photon source means is an array of xenon-filled or krypton-filled electric glow discharge flash lamps which are fired consecutively, controlled by said modulation means to precisely modulate the photons from said photon source means.

5. An arrangement of gravity modulator and gravity-modulation receiver in accordance with claim 1, wherein said photon source means, holding means for said photon source means, said less-reflective target and said mounting means for said less-reflective target are integrated.

6. An arrangement of gravity modulator and gravity-modulation receiver in accordance with claim 1, wherein said photon source means is a non-inductive conductor, producing non-coherent photons with the passage of an electric current through said non-inductive conductor; said passage of said electric current controlled by said modulation means to precisely modulate the photons from said photon source means.

7. An arrangement of gravity modulator and gravity-modulation receiver in accordance with claim 6, wherein said non-inductive conductor is a Mobius resistor, producing non-coherent photons with the passage of an electric current through said Mobius resistor; said passage of said electric current controlled by said modulation means to precisely modulate the photons from said photon source means.

8. An arrangement of gravity modulator and gravity-modulation receiver comprising:

at least one gravity modulator producing gravity modulation, having at least one photon source means, holding means for said photon source means, modulation means to precisely modulate photons from said photon source means, a less-reflective target for said photons, mounting means for said less-reflective target, and an optical resonant cavity with reflection means for said photons from said photon source means;

said target comprising either solid means, liquid means or both;

said resonant cavity fully or partially enclosing said photon source means;

said modulation means to precisely modulate photons from said photon source means, said less-reflective target for said photons, said holding means for said photon source means and said mounting means for said less-reflective target; and at least one gravity-modulation receiver means in or not in physical contact with said less-reflective target or said mounting means for said less-reflective target;

said receiver means having at least one piezo-electric transducer or at least one quartz crystal electrically connected to a differential amplifier or a charge amplifier to amplify the gravity modulation from said modulator for further signal processing;

when not in said physical contact with said less-reflective target or said mounting means for said less-reflective target, said at least one piezo-electric transducer loaded with a resonator mass with a natural resonant frequency either equal to, half, one third or one fifth of the frequency of said modulation means;

when not in said physical contact with said less-reflective target or said mounting means for said less-reflective target, said at least one quartz crystal gravity biased with a shaped high-density metal biasing piece placed along one direction of the oscillation mode of said at least one quartz crystal having a natural resonant frequency either equal to, half, one third or one fifth of the frequency of said modulation means.

9. An arrangement of gravity modulator and gravity-modulation receiver in accordance with claim 8, wherein said photon source means is either a carbon film resistor, metal film resistor, a thick film resistor, a wire resistor or an electric glow discharge lamp, producing non-coherent photons with the passage of an electric current through said carbon film, metal film, thick film resistor, wire resistor or electric glow discharge lamp; said passage of said electric current controlled by said modulation means to precisely modulate the photons from said photon source means.

10. An arrangement of gravity modulator and gravity-modulation receiver in accordance with claim 8, wherein said photon source means is a light emitting diode producing non-coherent photons or a laser light emitting diode producing coherent photons.

11. An arrangement of gravity modulator and gravity-modulation receiver in accordance with claim 8, wherein said photon source means is an array of xenon-filled or krypton-filled electric glow discharge flash lamps which are fired consecutively, controlled by said modulation means to precisely modulate the photons from said photon source means.

12. An arrangement of gravity modulator and gravity-modulation receiver in accordance with claim 8, wherein said photon source means, holding means for said photon source means, said less-reflective target and said mounting means for said less-reflective target are integrated.

13. An arrangement of gravity modulator and gravity-modulation receiver in accordance with claim 8, wherein said photon source means is a non-inductive conductor, producing non-coherent photons with the passage of an electric current through said non-inductive conductor; said passage of said electric current controlled by said modulation means to precisely modulate the photons from said photon source means.

14. An arrangement of gravity modulator and gravity-modulation receiver in accordance with claim 13, wherein said non-inductive conductor is a Mobius resistor, producing non-coherent photons with the passage of an electric current through said Mobius resistor; said passage of said electric current controlled by said modulation means to precisely modulate the photons from said photon source means.

15. An arrangement of gravity modulator and gravity-modulation receiver comprising:
   at least one gravity modulator producing gravity modulation, having at least one electromagnetic radiation source means, holding means for said electromagnetic radiation source means, modulation means to precisely modulate electromagnetic radiation from said electromagnetic radiation source means, a less-reflective target for said electromagnetic radiation, mounting means for said target, a resonant cavity with reflection means for said electromagnetic radiation from said electromagnetic radiation source means;
   said target comprising either a solid means, a liquid means or both;
   said resonant cavity either fully, partially or selectively enclosing said electromagnetic radiation source means, said modulation means to precisely modulate electromagnetic radiation from said electromagnetic radiation source means, said less-reflective target for said electromagnetic radiation, said holding means for said electromagnetic radiation source means and said mounting means for said less-reflective target; and
   at least one gravity-modulation receiver means in or not in physical contact with said less-reflective target or said mounting means for said less-reflective target;
   said receiver means having at least one piezo-electric transducer or at least one quartz crystal electrically connected to a differential amplifier or a charge amplifier to amplify the gravity modulation from said modulator for further signal processing;
   said at least one piezo-electric transducer loaded with a resonator mass with a natural resonant frequency either equal to, half, one third or one fifth of the frequency of said modulation means, when not in said physical contact with said less-reflective target; and
   said at least one quartz crystal gravity biased with a shaped high-density metal biasing piece placed along one direction of the oscillation mode of said at least one quartz crystal having a natural resonant frequency either equal to, one third or one fifth of the frequency of said modulation means, when not in said physical contact with said less-reflective target.

16. An arrangement of gravity modulator and gravity-modulation receiver in accordance with claim 15, wherein said electromagnetic radiation source means is either a carbon film resistor, metal film resistor, a thick film resistor, a wire resistor or an electric glow discharge lamp, producing electromagnetic radiation with the passage of an electric current through said carbon film, metal film, thick film resistor, wire resistor or electric glow discharge lamp; said passage of said electric current controlled by said modulation means to precisely modulate the electromagnetic radiation from said electromagnetic radiation source means.

17. An arrangement of gravity modulator and gravity-modulation receiver in accordance with claim 15, wherein said electromagnetic radiation source means is a light emitting diode producing non-coherent electromagnetic radiation or a laser light emitting diode producing coherent electromagnetic radiation.

18. An arrangement of gravity modulator and gravity-modulation receiver in accordance with claim 15, wherein said electromagnetic radiation source means is an array of xenon-filled or krypton-filled electric glow discharge flash lamps which are fired consecutively, controlled by said modulation means to precisely modulate the electromagnetic radiation from said electromagnetic radiation source means.

19. An arrangement of gravity modulator and gravity-modulation receiver in accordance with claim 15, wherein said electromagnetic radiation source means, holding means for said electromagnetic radiation source means, said less-reflective target and said mounting means for said less-reflective target are integrated.

20. An arrangement of gravity modulator and gravity-modulation receiver in accordance with claim 15, wherein said electromagnetic radiation source means is a non-inductive conductor, producing non-coherent electromagnetic radiation with the passage of an electric current through said non-inductive conductor; said passage of said electric current controlled by said modulation means to precisely modulate the electromagnetic radiation from said electromagnetic radiation source means.

* * * * *